US010235874B2

(12) United States Patent
Wang et al.

(10) Patent No.: US 10,235,874 B2
(45) Date of Patent: Mar. 19, 2019

(54) REMOTE CONTROL SYSTEM, REMOTE CONTROL METHOD AND GATEWAY

(71) Applicant: PEGATRON CORPORATION, Taipei (TW)

(72) Inventors: Nien-Chih Wang, Taipei (TW); Wei-Hua Hao, Taipei (TW); Tien-Chu Chang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 15/974,168

(22) Filed: May 8, 2018

(65) Prior Publication Data

US 2018/0322774 A1 Nov. 8, 2018

(30) Foreign Application Priority Data

May 8, 2017 (TW) ............................ 106115165 A

(51) Int. Cl.
*G08C 23/04* (2006.01)
*H04B 10/114* (2013.01)

(52) U.S. Cl.
CPC ......... *G08C 23/04* (2013.01); *G08C 2201/32* (2013.01); *G08C 2201/92* (2013.01)

(58) Field of Classification Search
CPC .............................. G08C 23/04; H04B 10/114
See application file for complete search history.

(56) References Cited

U.S. PATENT DOCUMENTS 9,460,596 B1 10/2016 Moses
2012/0019674 A1 1/2012 Ohnishi et al.
2012/0146918 A1 6/2012 Kreiner et al.
2013/0215019 A1* 8/2013 Liberty .................. G06F 3/017 345/157
2013/0271372 A1 10/2013 Nasiri et al.
2013/0346144 A1 12/2013 Ferren et al.
2014/0266639 A1 9/2014 Zises
2016/0302044 A1 10/2016 Bottazzi et al.
2018/0120898 A1* 5/2018 Law .................. H04N 21/4222
2018/0301023 A1* 10/2018 Desplats ................ G06F 3/038

FOREIGN PATENT DOCUMENTS

| | | |
|---|---|---|
| CN | 102301738 | 12/2011 |
| JP | 2016034066 | 3/2016 |
| TW | 200807288 | 2/2008 |

* cited by examiner

*Primary Examiner* — Shi K Li
(74) *Attorney, Agent, or Firm* — J.C. Patents

(57) ABSTRACT

A remote control method, and a remote control system and a gateway for implementing the method are provided. The method includes receiving, by a remote control device, a plurality of ultra-wideband signals transmitted by a main control device to calculate position data; calculating, by the remote control device, rotation vector data according to detection data of the remote control device; transmitting, by the remote control device, the rotation vector data and the position data to the main control device to allow the main control device to identify an electronic device the remote control device aims at and transmit control information corresponding to the electronic device to the remote control device according to the rotation vector data and the position data; and displaying, by the remote control device, a control interface for controlling the electronic device according to the received control information.

18 Claims, 7 Drawing Sheets

REMOTE CONTROL SYSTEM, REMOTE CONTROL METHOD AND GATEWAY

CROSS-REFERENCE TO RELATED APPLICATION

This application claims the priority benefit of Taiwan application serial no. 106115165, filed on May 8, 2017. The entirety of the above-mentioned patent application is hereby incorporated by reference herein and made a part of this specification.

BACKGROUND

Technology Field

The disclosure relates to a remote control system, and in particular, to a remote control system, a remote control method, and a gateway.

Description of Related Art

As technology advances, many household appliances (e.g., TVs, set-top boxes, radios, video players, air-conditioners, lights, fans, etc.) in our daily life are provided with their own remote control devices to allow a user to remotely control the corresponding household appliances. However, if excessive remote control devices are present in the household, when the user would like to control a specific household appliance, the user has to find the remote control device corresponding to the specific household appliance to perform remote control, which causes inconvenience in the user's control of the household appliances.

Generally, to solve this issue, universal remote controls or learning remote controls are developed in the related art. The universal remote controls or learning remote controls learn functions of some buttons on the original remote control corresponding to a household appliance, or switch between different remote controls according to the user's needs to control different household appliances. However, an issue is that the universal remote controls or learning remote controls still require the user to actively press buttons to switch between remote controls. Moreover, another issue is that since the position format/texts of the buttons on the universal remote controls or learning remote controls are already fixed, the user is required to memorize the correspondence between the buttons and the functions of the household appliances currently to be operated, which makes the use of the universal remote controls or learning remote controls inconvenient and less human-centered.

SUMMARY

The embodiments of the invention provide a remote control system in which a remote control device displays a control interface corresponding to an electronic device directed to by the remote control device to allow a user to intuitively remotely control the electronic device directed to by the remote control device.

An embodiment of the invention provides a remote control system. The remote control system includes a main control device and a remote control device. The remote control device is configured to remotely control a plurality of electronic devices and includes a second processing unit, a rotation vector sensor, an ultra-wideband module, a second communication module, and a touch display module. The rotation vector sensor is coupled to the second processing unit and is configured to calculate rotation vector data according to detection data of the remote control device. The ultra-wideband module is coupled to the second processing unit and is configured to receive a plurality of ultra-wideband signals to calculate position data of the remote control device. The second communication module is coupled to the second processing unit and is configured to transmit the rotation vector data and the position data. The touch display module is coupled to the second processing unit and is configured to display a plurality of control interfaces. The second processing unit is configured to selectively command the display module to display one of the control interfaces according to one of a plurality of control information, and control functions of the electronic devices through the control interfaces. The main control device includes an ultra-wideband positioning system, a first processing unit, a storage unit, and a first communication module. The ultra-wideband positioning system includes a plurality of ultra-wideband beacons and is configured to transmit a plurality of respective ultra-wideband signals. The storage unit is configured to store the control information corresponding to the electronic devices. The first communication module is configured to establish a wireless connection with the second communication module, and receive the rotation vector data and the position data from the remote control device via the wireless connection. The first processing unit identifies a first electronic device the remote control device aims at among the electronic devices according to the rotation vector data and the position data, reads first control information corresponding to the first electronic device recorded in the storage unit, and transmits the first control information to the remote control device via the wireless connection, wherein the second processing unit commands the display module to display a first control interface among the control interfaces according to the received first control information, and functions of the first electronic device are controlled through the first control interface.

In an embodiment of the invention, the rotation vector sensor includes a micro-processor, an accelerometer, a gyroscope, and a magnetometer, wherein the micro-processor performs a fusion operation according to a first detection value detected by the accelerometer, a second detection value detected by the gyroscope, and a third detection value detected by the magnetometer to calculate the rotation vector data, wherein the rotation vector data includes an azimuth value, a tilt value, and a roll value.

In an embodiment of the invention, the ultra-wideband positioning system further includes an ultra-wideband management module, wherein when the second processing unit receives the calculated rotation vector data from the rotation vector sensor, the ultra-wideband management module receives a positioning request transmitted by the first processing unit via the wireless connection and commands the ultra-wideband beacons to respectively transmit the respective ultra-wideband signals according to the received positioning request.

In an embodiment of the invention, the ultra-wideband beacons include a first ultra-wideband beacon, a second ultra-wideband beacon, and a third ultra-wideband beacon, wherein the first ultra-wideband beacon transmits a first ultra-wideband signal, the second ultra-wideband beacon transmits a second ultra-wideband signal, and the third ultra-wideband beacon transmits a third ultra-wideband signal, and the ultra-wideband module is further configured to calculate a first three-dimensional coordinate value, a second three-dimensional coordinate value, and a third three-dimensional coordinate value according to the first ultra-wideband signal, the second ultra-wideband signal, and the third ultra-wideband signal that are received, and input the first three-dimensional coordinate value, the second three-dimensional coordinate value, and the third three-dimensional coordinate value into a Kalman filter to calculate the position data.

In an embodiment of the invention, the storage unit is further configured to record a plurality of device coordinates corresponding to the respective electronic devices, and the first processing unit is further configured to obtain an aiming path according to the rotation vector data and the position data, identify a first device coordinate among one or more device coordinates in the aiming path that is closest to the remote control device, and identify that the electronic device corresponding to the first device coordinate is the first electronic device, wherein the aiming path is configured to represent a path of an infrared signal transmitted by the remote control device according to a current position and orientation of the remote control device.

In an embodiment of the invention, the remote control device further includes an infrared ray transceiving module, coupled to the second processing unit and configured to receive or transmit an infrared signal, wherein the infrared ray transceiving module transmits the infrared signal to the first electronic device according to an infrared code set of the first control information and a touch operation applied on the first control interface, and the first electronic device executes one of the functions of the first electronic device according to the received infrared signal.

An embodiment of the invention provides a remote control method suitable for remotely controlling a plurality of electronic devices. The method includes transmitting, by a main control device, a plurality of ultra-wideband signals; receiving, by a remote control device, the ultra-wideband signals to calculate position data of the remote control device; calculating, by the remote control device, rotation vector data according to detection data detected by the remote control device; transmitting, by the remote control device, the rotation vector data and the position data to the main control device; identifying, by the main control device, a controlled electronic device the remote control device aims at among the electronic devices and transmitting control information corresponding to the controlled electronic device to the remote control device according to the rotation vector data and the position data; and displaying, by the remote control device, a control interface corresponding to the controlled electronic device according to the received control information, so that functions of the controlled electronic device are controlled through the control interface.

In an embodiment of the invention, the remote control device includes an accelerometer, a gyroscope, and a magnetometer, wherein the step of calculating, by the remote control device, the rotation vector data according to the detection data detected by the remote control device includes: performing a fusion operation according to a first detection value detected by the accelerometer, a second detection value detected by the gyroscope, and a third detection value detected by the magnetometer to calculate the rotation vector data, wherein the rotation vector data includes an azimuth value, a tilt value, and a roll value.

In an embodiment of the invention, the step of transmitting, by the main control device, the ultra-wideband signals includes: transmitting, by the remote control device, a positioning request to the main control device, when the rotation vector data is calculated; and transmitting, by the main control device, the ultra-wideband signals in response to the received positioning request.

In an embodiment of the invention, the ultra-wideband signals include a first ultra-wideband signal, a second ultra-wideband signal, and a third ultra-wideband signal, and the step of receiving, by the remote control device, the ultra-wideband signals to calculate the position data of the remote control device includes: calculating, by the remote control device, a first three-dimensional coordinate value, a second three-dimensional coordinate value, and a third three-dimensional coordinate value according to the first ultra-wideband signal, the second ultra-wideband signal, and the third ultra-wideband signal that are received, and inputting the first three-dimensional coordinate value, the second three-dimensional coordinate value, and the third three-dimensional coordinate value into a Kalman filter to calculate the position data.

In an embodiment of the invention, the remote control method further includes storing, by the main control device, a plurality of device coordinates of the electronic devices, wherein the step of identifying, by the main control device, the controlled electronic device the remote control device aims at among the electronic devices according to the rotation vector data and the position data includes: obtaining, by the main control device, an aiming path according to the rotation vector data and the position data, wherein the aiming path is configured to represent a path of an infrared signal transmitted by the remote control device according to current position and orientation of the remote control device; and identifying, by the main control device, a controlled device coordinate that is in the aiming path and is closest to the remote control device according to the aiming path and the device coordinates, and identifying that the electronic device corresponding to the controlled device coordinate is the controlled electronic device.

In an embodiment of the invention, the step of displaying, by the remote control device, the control interface according to the received control information, so that the functions of the controlled electronic device are controlled through the control interface includes: generating and displaying, by the remote control device, the control interface according to the control information; transmitting, by the remote control device, an infrared signal to the controlled electronic device according to an infrared code set of the control information and a touch operation applied on the control interface; and executing, by the controlled electronic device, a function among the functions of the controlled electronic device corresponding to the infrared signal according to the received infrared signal.

An embodiment of the invention provides a gateway. The gateway includes an ultra-wideband positioning system including a plurality of ultra-wideband beacons, a first processing unit, a first storage unit, and first communication module. The ultra-wideband beacons are configured to individually transmit a plurality of ultra-wideband signals. The first storage unit is configured to store a plurality of control information corresponding to a plurality of respective electronic devices. The first communication module is configured to establish a first wireless connection with a remote control device and is further configured to establish a network connection. The first processing unit receives rotation vector data and position data from the remote control device via the first wireless connection, identifies a first electronic device the remote control device aims at among the electronic devices according to the rotation vector data and the position data, and reads first control information corresponding to the first electronic device recorded in the storage unit. The first processing unit transmits the first control information to the remote control device via the first wireless connection, such that the remote control device displays a first control interface according to the received first control information, and functions of the first electronic device are thereby controlled through the first control interface.

In an embodiment of the invention, the rotation vector data includes an azimuth value, a tilt value, and a roll value.

In an embodiment of the invention, the ultra-wideband beacons include a first ultra-wideband beacon, a second ultra-wideband beacon, and a third ultra-wideband beacon, wherein the ultra-wideband positioning system further includes an ultra-wideband management module configured to receive a positioning request transmitted by the remote control device via the wireless connection, and command the first ultra-wideband beacon to transmit a first ultra-wideband signal, the second ultra-wideband beacon to transmit a second ultra-wideband signal, and the third ultra-wideband beacon to transmit a third ultra-wideband signal in response to the received positioning request.

In an embodiment of the invention, the position data is obtained by inputting a first three-dimensional coordinate value, a second three-dimensional coordinate value, and a third three-dimensional coordinate value into a Kalman filter, wherein the first three-dimensional coordinate value, the second three-dimensional coordinate value, and the third three-dimensional coordinate value are individually calculated and obtained by the remote control device according to the first ultra-wideband signal, the second ultra-wideband signal, and the third ultra-wideband signal that are received.

In an embodiment of the invention, the storage unit records a plurality device coordinates corresponding to the respective electronic devices, and the processing unit obtains an aiming path according to the rotation vector data and the position data, wherein the aiming path is configured to represent a path of an infrared signal transmitted by the remote control device according to current position and orientation of the remote control device, and the processing unit identifies a first device coordinate among one or more device coordinates located in the aiming path that is closest to the remote control device according to the device coordinates and the aiming path, and identifies that the electronic device corresponding to the first device coordinate is the first electronic device.

In an embodiment of the invention, the first control information includes an infrared code set corresponding to the functions of the first electronic device, and the infrared code set includes a plurality of infrared codes corresponding to the respective functions of the first electronic device.

Accordingly, in the remote control system, the remote control method, and the gateway provided in the embodiments of the invention, with the position data obtained by the remote control device by receiving the plurality of ultra-wideband signals transmitted by the main control device and the rotation vector data sensed by the remote control device, the main control device can identify the controlled electronic device directed to by the remote control device and transmit the control information corresponding to the controlled electronic device to the remote control device to display the control interface corresponding to the controlled electronic device and allow the user to intuitively remotely control the electronic device directed to through the remote control device, which thereby enhances convenience of remote control operations performed by the user.

To provide a further understanding of the aforementioned and other features and advantages of the disclosure, exemplary embodiments, together with the reference drawings, are described in detail below.

DESCRIPTION OF THE EMBODIMENTS

Figure 1:
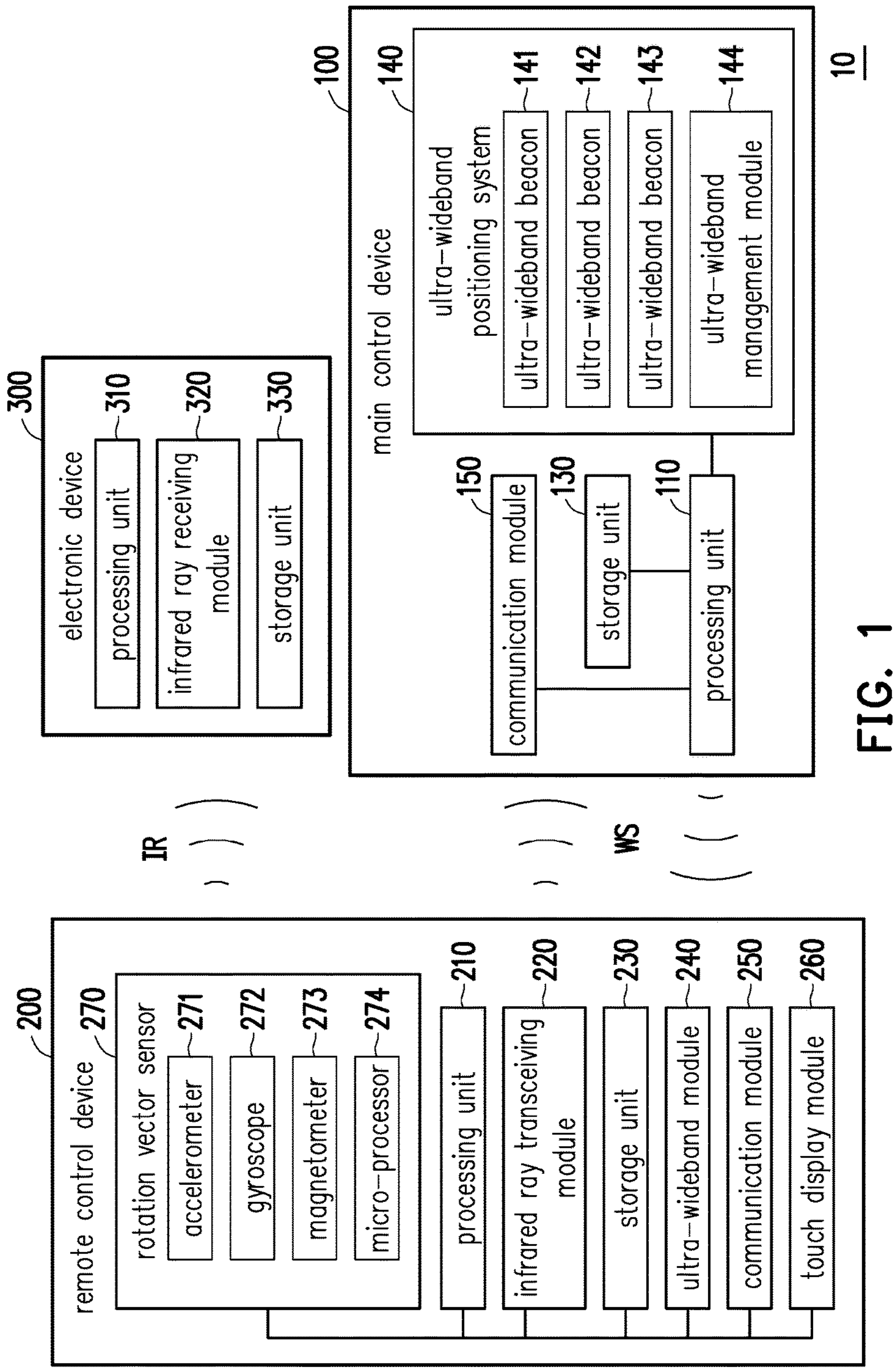
FIG. 1 is a block schematic diagram illustrating a remote control system according to an embodiment of the invention.

FIG. 1 is a block schematic diagram illustrating a remote control system according to an embodiment of the invention. Referring to FIG. 1, a remote control system 10 includes a main control device 100, a remote control device 200, and an electronic device 300 (also referred to as a first electronic device or a controlled electronic device).

The main control device 100 includes a processing unit 110 (also referred to as a first processing unit), and a storage unit 130 (also referred to as a first storage unit), an ultra-wideband positioning system 140, and a communication module 150 (also referred to as a first communication module) coupled to the processing unit 110. In the present embodiment, the main control device 100 is, for example, a gateway provided with the ultra-wideband positioning system 140. The gateway provides an interconnection method for dissimilar network types or network communication protocols and is technically defined as "an apparatus or a node configured to interconnect dissimilar networks". In other words, the gateway works as a common access point for "dissimilar networks (networks at different levels)" (e.g., a local area network (LAN) and a wide area network (WAN)). Moreover, the gateway includes hardware, software, or an apparatus combining hardware and software and provides a function of converting a simple communication protocol encapsulation into a complex communication protocol.

For example, on the Internet, the gateway is interfaced between two different systems and works for conversion between other resources and network hypertexts. It is noted that, in another embodiment, the main control device 100 may also be a router. The router is an electrical communication network device providing two important mechanisms: routing and relaying. It determines a routing path of a packet from a source end to a destination end (a transmission path from a host to another host). This process is called routing. Moving a packet from an input end of the router to an appropriate output end of the router (operating inside the router) is called relaying. In another embodiment, the main control device may also be an electronic device of another type that is provided with the ultra-wideband positioning system and has a wireless communication function.

The remote control device 200 includes a processing unit 210 (also referred to as a second processing unit), and an infrared ray transceiving module 220, a storage unit 230 (also referred to as a second storage unit), an ultra-wideband module 240, a communication module 250 (also referred to as a second communication module), a touch display module 260 (also referred to as a touch screen or a display module), and a rotation vector sensor 270 coupled to the processing unit 210.

The electronic device 300 includes a processing unit 310 (also referred to as a third processing unit), an infrared ray receiving module 320, and a storage unit 330. It is noted that, to facilitate illustration, the embodiments below mainly use one electronic device (e.g., the electronic device 300) as the electronic device to be controlled by a user by using the remote control device, but the invention does not limit the number of the (controlled) electronic devices in the remote control system 10.

The processing unit 110, the processing unit 210, and the processing unit 310 are all hardware having computational capacity (e.g., chipsets and processors). In the present embodiment, the processing unit 110, the processing unit 210, and the processing unit 310 are, for example, central processing units (CPU), micro-processors, or other programmable processors, digital signal processors (DSP), programmable controllers, application specific integrated circuits (ASIC), programmable logic devices (PLDs), or other similar devices. The processing unit 110, the processing unit 210, and the processing unit 310 are configured to control overall operations of the main control device 100, the remote control device 200, and the electronic device 300, respectively.

The storage unit 130, the storage unit 230, and the storage unit 330 are, for example, any types of hard disk drives (HDD), non-volatile memory storage devices (e.g., solid-state disks), or other types of storage circuits. The storage unit 130, the storage unit 230 and the storage unit 330 store firmware/software for managing the main control device 100, the remote control device 200, and the electronic device 300. The storage unit 130 temporarily stores data according to commands of the processing unit 110. The data include data configured to manage the main control device 100, data received from the remote control device 200, or other types of data, but the invention is not limited hereto. Moreover, the storage unit 130 further records data that require long-time storage according to commands of the processing unit 110. For example, the storage unit 130 stores a control information database, which is configured to record control information corresponding to respective electronic devices. It is noted that, in another embodiment, the storage unit 130 may also be included in the processing unit 110. The storage unit 230 may also store data received from the main control device 100.

In the present embodiment, an ultra-wideband management module 144, ultra-wideband beacons 141 to 143, and the ultra-wideband module 240 are, for example, circuits or chips supporting ultra-wideband (UWB) specifications. An ultra-wideband signal is referred to as a radio signal compatible with ultra-wideband specifications. The ultra-wideband is a wireless personal area network communication technique having low power consumption and high-speed data rate. It is suitable for wireless communication applications requiring high-quality services and is applicable to fields including wireless personal area networks (WPAN), home network connections, and short-range radars. The ultra-wideband signal uses pulse signals, rather than continuous sine waves, for transmission. Other details of the ultra-wideband signal are already familiar to people skilled in the art and shall not be repeatedly described herein. The ultra-wideband positioning system 140 includes ultra-wideband beacons 141 to 143 and an ultra-wideband management module 144. In the present embodiment, the ultra-wideband management module 144 is configured to command the ultra-wideband beacons 141 to 143 to individually transmit ultra-wideband signals. In the present embodiment, the ultra-wideband beacon transmits an ultra-wideband signal only when receiving a command from the ultra-wideband management module 144. Accordingly, the ultra-wideband beacons 141 to 143 do not actively transmit an ultra-wideband signal when they do not receive a command from the ultra-wideband management module 144, which thereby saves power consumption. In the present embodiment, the ultra-wideband module 240 receives one or more ultra-wideband signals, and calculates coordinates (also referred to as relative coordinates or position data) of the ultra-wideband module 240 relative to a transmission source of the received ultra-wideband signals according to the received ultra-wideband signals. It is noted that, in another embodiment, an ultra-wideband connection may also be established between the ultra-wideband positioning system 140 and the ultra-wideband module 240 to allow the main control device 100 and the remote control device 200 to transmit data to each other via the established ultra-wideband connection.

The communication module 150 and the communication module 250 support, for example, one or a combination of the Global System for Mobile Communication (GSM), the Personal Handy-phone System (PHS), the Code Division Multiple Access (CDMA) system, the Wireless Fidelity (WiFi) system, the Worldwide Interoperability for Microwave Access (WiMAX) system, the third-generation wireless communication technology (3G), the Long Term Evolution (LTE), and the Bluetooth (BT) communication technology, but the invention is not limited hereto. The communication module 150 and the communication module 250 are configured to establish a wireless connection WS (also referred to as a first wireless connection) through wireless communication to allow the main control device 100 and the remote control device 200 to transmit data to each other via the first wireless connection. In the present embodiment, the first wireless connection is established through Bluetooth communication.

The infrared ray transceiving module 220 is a circuit unit including an infrared ray receiver (IR receiver) configured to receive infrared (IR) signals and an infrared ray transmitter (IR transmitter) configured to transmit infrared signals. The infrared ray transceiving module 220 transmits infrared signals (infrared rays) with specific wavelengths, frequencies, and time intervals according to a command (an infrared code) of the processing unit 210. It is noted that, in an embodiment, the infrared ray transceiving module 220 may also be integrated into the communication module 250.

The infrared ray receiving module 320 is, for example, an infrared ray receiver or an infrared ray receiving circuit element. The infrared ray receiving module 320 is configured to receive infrared signals.

In the present embodiment, the remote control device 200 controls functions of the electronic device 300 by transmitting infrared signals IR to the infrared ray receiving module 320 (also referred to as an infrared ray receiver) of the electronic device 300. Specifically, when the infrared ray receiving module 320 receives an infrared signal IR transmitted by the remote control device 200, the infrared ray receiving module 320 converts the infrared signal IR into a corresponding command code and transmits the command code to the processing unit 310. Next, the processing unit 310 issues a corresponding control command according to the command code (e.g., determining a control command corresponding to the command code instructed by the received infrared signal by comparing the command code with a control command mapping table stored in the storage unit 330) to another electronic component in the electronic device 300 to control a function of the electronic device 300 corresponding to the electronic component. The infrared ray receiving module 320 may also be replaced with an infrared ray transceiving module to allow the electronic device 300 to transmit infrared signals. It is a conventional technique for people skilled in the art that an electronic device executes its function according to a received infrared signal, and other details shall not be repeatedly described herein.

The touch display module 260 is configured to provide touch and display functions. For example, the touch display module 260 is composed of a display such as a liquid crystal display (LCD), a light-emitting diode (LED) display, and a field emission display (FED), with a resistive-type or a capacitive-type touch panel. The touch display module 260 is also briefly referred to as a touch screen. In the present embodiment, the touch display module 260 displays a control interface corresponding to the controlled electronic device to allow the user to execute functions of the controlled electronic device (remotely controlling the controlled electronic device) through touch operations on the control interface. Accordingly, the second processing unit 210 can determine the function of the controlled electronic device that the user would like to execute according to the touch operation on the control interface sensed by the touch display module 260, and an infrared signal corresponding to the function can be transmitted by the infrared ray transceiving module 220.

In the present embodiment, the rotation vector sensor 270 includes an accelerometer 271, a gyroscope 272, a magnetometer 273, and a micro-processor 274. In the present embodiment, the accelerometer 271 is configured to detect an acceleration value (also referred to as a first detection value) of the remote control device 200; the gyroscope 272 is configured to detect a rotation angle (also referred to as a second detection value) of the remote control device 200; and the magnetometer 273 is configured to detect an azimuth (also referred to as a third detection value) of the remote control device 200. The accelerometer 271, the gyroscope 272, and the magnetometer 273 are all hardware components familiar to people skilled in the art and shall not be repeatedly described herein. In the present embodiment, the micro-processor 274 is configured to perform a fusion operation according to the first detection value, the second detection value, and the third detection value to calculate rotation vector data. Specifically, the rotation vector data includes an azimuth value, a tilt value, and a roll value. The micro-processor 274 transmits the rotation vector data to the second processing unit 210. Moreover, in an embodiment, the micro-processor 274 further calibrates the accelerometer 271, the gyroscope 272, and the magnetometer 273 according to the detection values measured by the accelerometer 271, the gyroscope 272, and the magnetometer 273. It is noted that, in another embodiment, the micro-processor of the rotation vector sensor 270 may detect an (movement) orientation of the remote control device 200 (may also be referred as the attitude of the remote control device) through sensors of other types to obtain a plurality of detection values, and may perform a fusion operation on the obtained measurement values to thereby obtain the rotation vector data.

A remote control method provided in the embodiments of the invention is described below with reference to FIG. 1 and FIG. 2.

Figure 2:
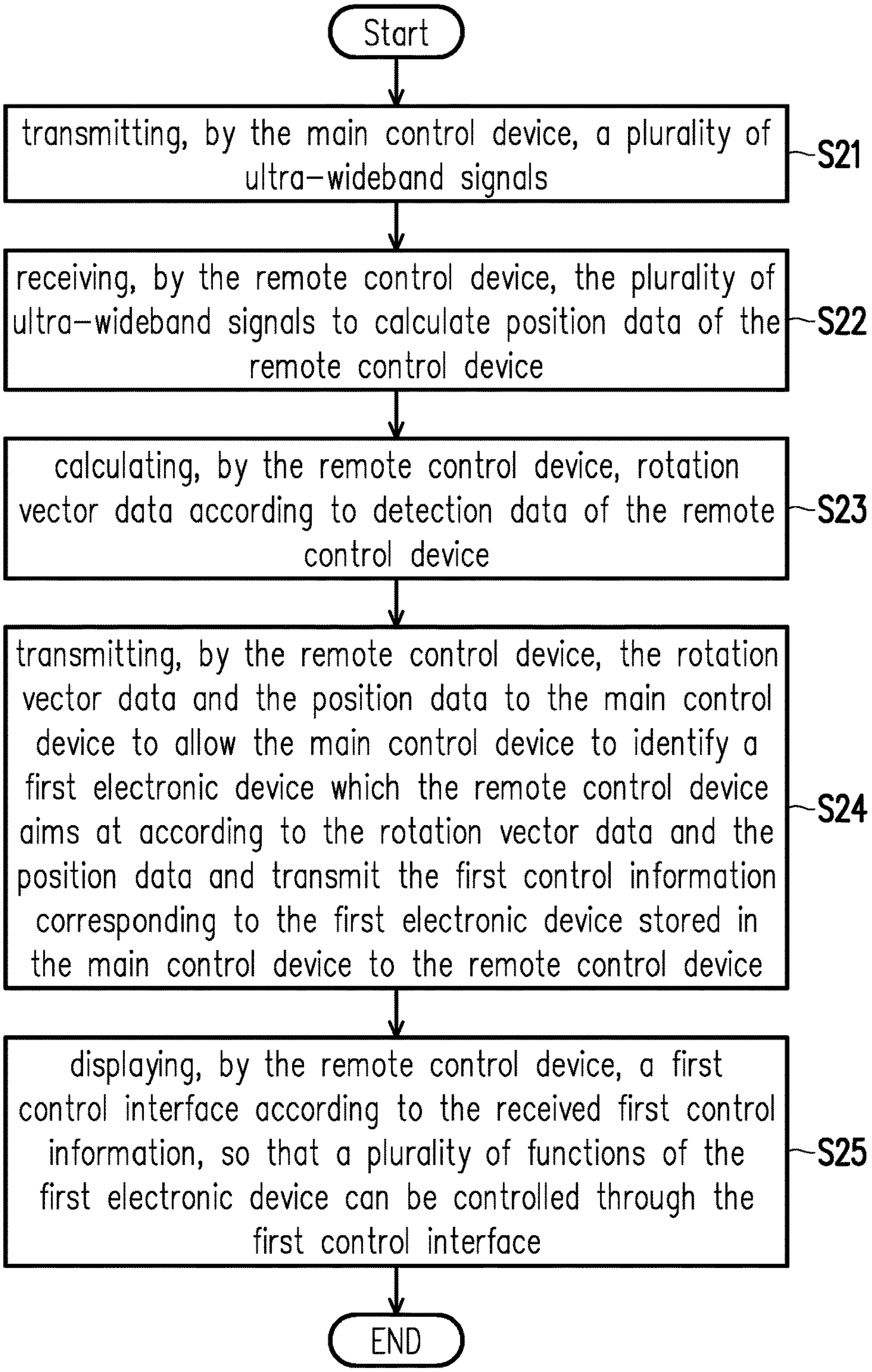
FIG. 2 is a flowchart illustrating a remote control method according to an embodiment of the invention.

FIG. 2 is a flowchart illustrating a remote control method according to an embodiment of the invention. Referring to FIG. 1 and FIG. 2 together, in the present embodiment, it is assumed that a Bluetooth connection WS (also referred to as a first wireless connection) has been established between the remote control device 200 and the main control device 100. In step S21, ultra-wideband signals are transmitted by the main control device 100. In the present embodiment, the ultra-wideband management module 144 receives a positioning request from the remote control device 200 to command the ultra-wideband beacons 141 to 143 to transmit ultra-wideband signals. When the second processing unit 210 determines that the remote control device 200 is currently moved (e.g., a user picks up the remote control device 200) according to detection data detected by a sensor (e.g., an accelerometer, a vibration sensor, etc.), the second processing unit 210 transmits a positioning request to the main control device 100 via the first wireless connection WS to notify the main control device 100 to transmit ultra-wideband signals. It is noted that, in another embodiment, when a switch on the remote control device 200 is pressed, the remote control device 200 may also transmit the positioning request to the main control device 100.

Figure 3:
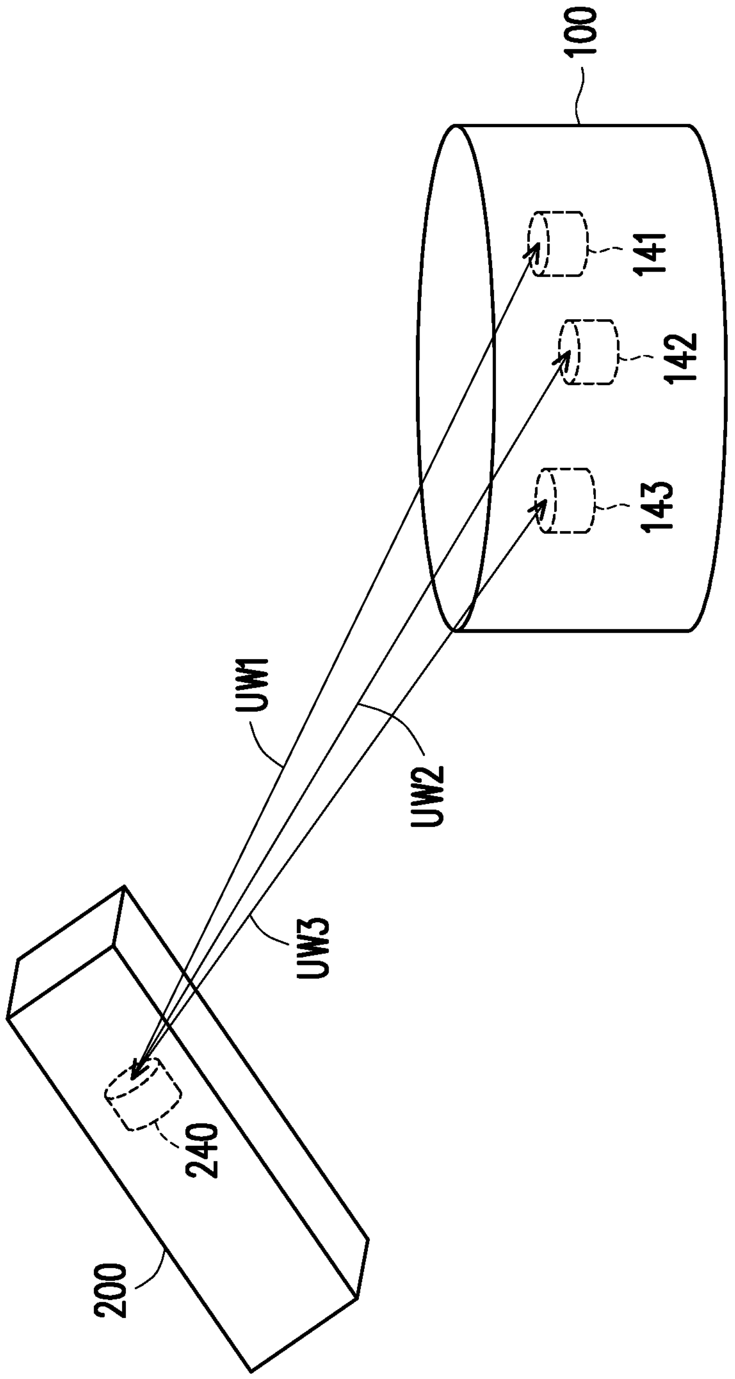
FIG. 3 is a schematic diagram illustrating a remote control device calculating position data corresponding to the remote control device according to a plurality of ultra-wideband signals according to an embodiment of the invention.

Next, in step S22, the ultra-wideband signals are received by the remote control device 200 to calculate position data of the remote control device. FIG. 3 is a schematic diagram illustrating a remote control device calculating position data corresponding to the remote control device according to ultra-wideband signals according to an embodiment of the invention. Referring to FIG. 3, as described above, the remote control device 200 transmits the positioning request to the main control device 100, and the ultra-wideband positioning system 140 transmits ultra-wideband signals. Namely, the first ultra-wideband beacon 141 transmits a first ultra-wideband signal UW1; the second ultra-wideband beacon 142 transmits a second ultra-wideband signal UW2; and the third ultra-wideband beacon 143 transmits a third ultra-wideband signal UW3. The ultra-wideband module 240 receives the ultra-wideband signals transmitted by the ultra-wideband positioning system 140 to calculate the position (three-dimensional coordinates) of the ultra-wideband module 240 relative to the ultra-wideband positioning system 140. The three-dimensional coordinates may also be used to represent the position (coordinates) of the remote control device 200 relative to the main control device 100.

Specifically, Upon the reception of the first ultra-wideband signal UW1, the second ultra-wideband signal UW2, and the third ultra-wideband signal UW3, the ultra-wideband module 240 calculates a first three-dimensional coordinate value, a second three-dimensional coordinate value, and a third three-dimensional coordinate value, respectively and inputs the first three-dimensional coordinate value, the second three-dimensional coordinate value, and the third three-dimensional coordinate value into a Kalman filter for calculation to obtain filtered three-dimensional coordinates as the position data. Moreover, the ultra-wideband module 240 uses different algorithms to calculate relative positions. The different algorithms are, for example, the Angle of Arrival (AOA) method, the Time of Arrival (TOA) method, the Time Difference of Arrival (TDOA) method, and the Received Signal Strength (RSS) method. In the present embodiment, the ultra-wideband module 240 uses the AOA method to calculate relative three-dimensional coordinate values according to the received ultra-wideband signals. The foregoing algorithms are conventional techniques of people skilled in the art and shall not be repeatedly described herein. After calculating the position data of the remote control device, the ultra-wideband module 240 transmits the obtained position data to the second processing unit 210.

Referring back to FIG. 2, in step S23, rotation vector data is calculated by the remote control device 200 according to detection data of the remote control device. As described above, the micro-processor 274 of the rotation vector sensor 270 performs a fusion operation according to a first detection value detected by the accelerometer 271, a second detection value detected by the gyroscope 272, and a third detection value detected by the magnetometer 273 to calculate the rotation vector data. After calculating the rotation vector data, the micro-processor 274 transmits the obtained rotation vector data to the second processing unit 210. In the present embodiment, an order of step S22 and step S23 may be reversed, or step S22 and step S23 may be executed simultaneously.

After obtaining the position data and the rotation vector data, in step S24, the rotation vector data and the position data are transmitted to the main control device 100 by the remote control device 200 to allow the main control device 100 to identify a first electronic device 300 which the remote control device 200 aims at according to the rotation vector data and the position data and transmit the first control information corresponding to the first electronic device 300 stored in the main control device 100 to the remote control device 200.

In the present embodiment, the second processing unit 210 transmits the received position data and rotation vector data to the first processing unit 110 via the first wireless connection WS. Then, the first processing unit 110 identifies a first electronic device 300 which the remote control device 200 aims at according to the rotation vector data and the position data. Further description is provided below with reference to FIG. 4 and FIG. 5.

Figure 4:
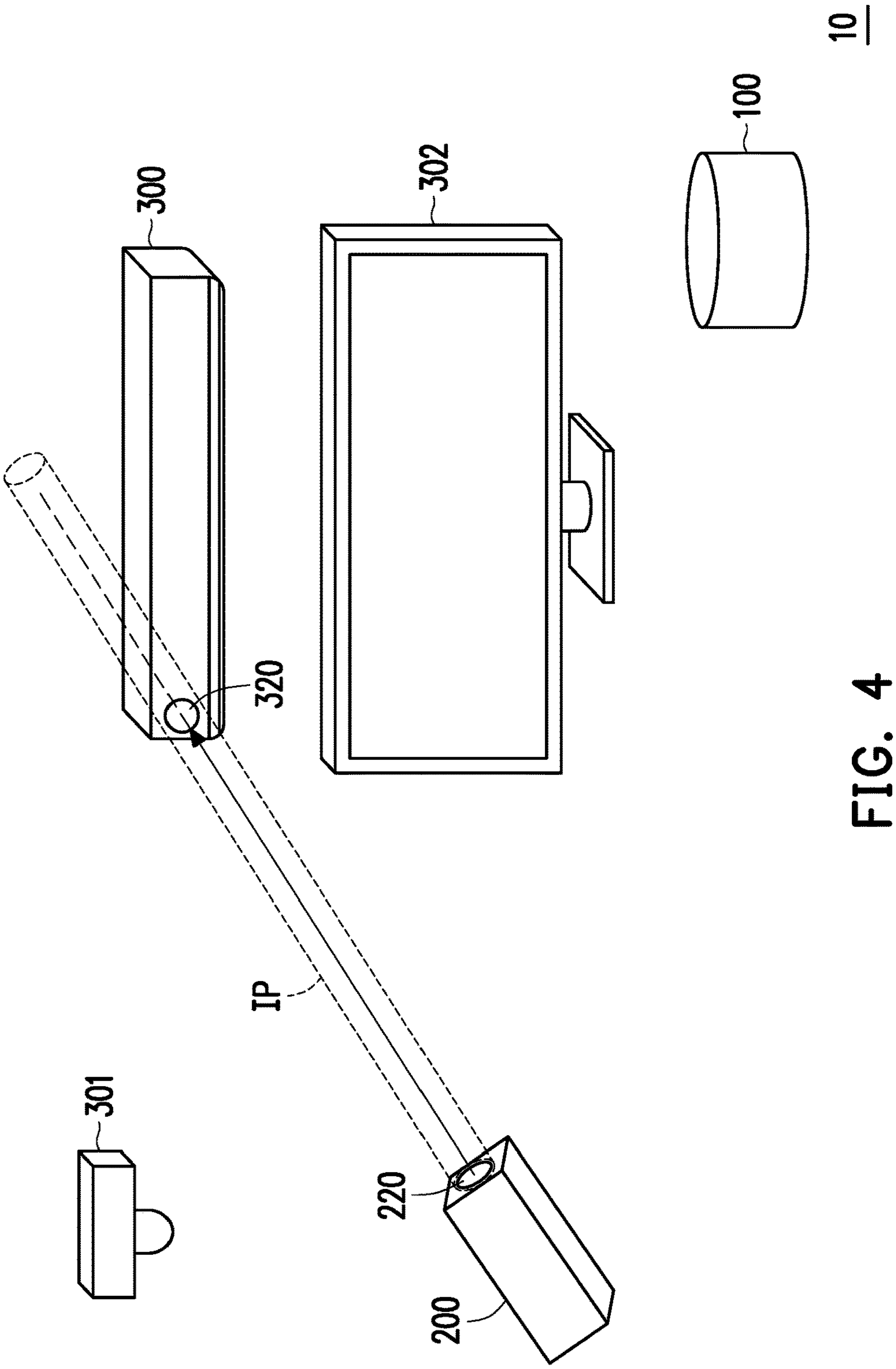
FIG. 4 is a schematic diagram illustrating identifying an electronic device directed to by a remote control device according to rotation vector data and position data of the remote control device according to an embodiment of the invention.
Figure 5:
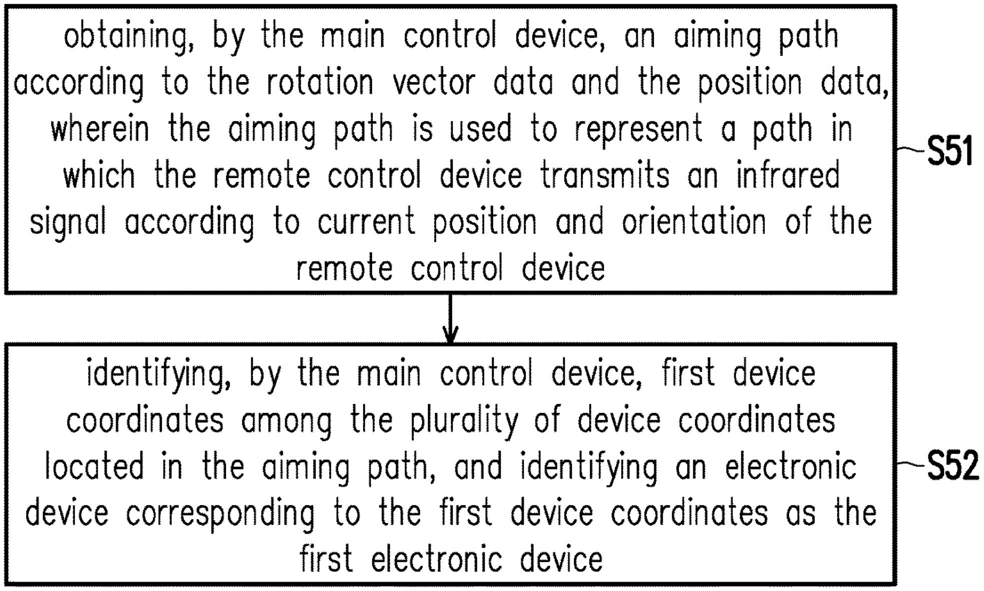
FIG. 5 is a flowchart illustrating steps of identifying an electronic device directed to by a remote control device according to rotation vector data and position data of the remote control device according to an embodiment of the invention.

FIG. 4 is a schematic diagram illustrating identifying an electronic device a remote control device aims at according to rotation vector data and position data of the remote control device according to an embodiment of the invention. FIG. 5 is a flowchart illustrating steps of identifying an electronic device a remote control device aims at according to rotation vector data and position data of the remote control device according to an embodiment of the invention. Referring to FIG. 4 and FIG. together, for example, it is assumed that the first electronic device 300 (e.g., an air-conditioner shown in FIG. 4), a second electronic device 301 (e.g., a light shown in FIG. 4), a third electronic device 302 (e.g., a TV shown in FIG. 4), the main control device 100, and the remote control device 200 are present in a space. Moreover, the remote control device 200 is picked up by a user and is directed to the first electronic device 300 (as indicated by an arrow in FIG. 4) which the user would like to control. Device coordinates (e.g., a first device coordinates corresponding to the first electronic device 300, a second device coordinates corresponding to the second electronic device 301, and a third device coordinates corresponding to the third electronic device 302) of the electronic devices 300, 301, 302 in the space are already recorded in the first storage unit 130. The device coordinates are used to represent (three-dimensional) relative coordinates of the corresponding electronic device with respect to the main control device. For example, the three-dimensional coordinates corresponding to the main control device 100 are set as "0, 0, 0", and the device coordinates of the electronic device are another coordinate value relative to the coordinate value "0, 0, 0". It is noted that, in another embodiment, the device coordinates of the electronic device may also be used to represent the relative coordinates of the electronic device with respect to a reference coordinate point, and the coordinate value of the reference coordinate point may be set as "0, 0, 0". The reference coordinate point is, for example, the main control device, another electronic device, or another fixed coordinate point applicable in the space of the remote control system.

In step S51, an aiming path IP is obtained by the main control device 100 according to the rotation vector data and the position data, wherein the aiming path IP is used to represent a path in which the remote control device 200 transmits an infrared signal according to the current position and the orientation of the remote control device 200. Further to the example above, the first processing unit 110 uses the position data to obtain position coordinates of the remote control device 200 relative to the main control device 100, uses the rotation vector data to identify a direction vector of where the remote control device 200 aims, and obtains the aiming path IP starting from the position coordinates according to the position coordinates of the remote control device 200 relative to the main control device 100 and the direction vector of where the remote control device 200 aims. The infrared signal transmitted by the remote control device 200 is also transmitted according to the direction of the aiming path IP. Specifically, it is possible that the aiming path is not exactly the path in which the infrared signal is transmitted. The aiming path is more similar to a three-dimensional columnar channel.

Two ends of the channel may be the controlled electronic device and the remote control device, and the direction of the channel may be used to indicate the direction in which the infrared signal is transmitted.

Then, in step S52, first device coordinates in the aiming path IP are identified by the main control device 100, and an electronic device corresponding to the first device coordinates is identified as the first electronic device 300. In other words, the first processing unit 110 compares whether any recorded device coordinates are included in the aiming path IP. If the first processing unit 110 determines that device coordinates of a device are included in the aiming path IP, the first processing unit 110 determines that the electronic device corresponding to the device coordinates is the electronic device (i.e., the controlled electronic device) the remote control device 200 aims at. In other words, the electronic devices 301, 302, which are not located in the aiming path, are not determined to be the controlled electronic devices.

It is noted that if sets of device coordinates are located in (included in) the aiming path IP, the first processing unit 110 selects one set of device coordinates that is closest to the remote control device 200 and determines that the electronic device of the closest device coordinates is the first electronic device (i.e., the electronic device that the user would like to control) directed to by the remote control device 200.

After determining that the first electronic device 300 is the electronic device (the controlled electronic device) the remote control device aims at, the first processing unit 110 reads the first control information corresponding to the first electronic device 300 from the control information stored in the control information database and transmits the first control information to the second processing unit 210 via the first wireless connection WS. The first control information includes a first interface format corresponding to the first electronic device 300 and a first infrared code set corresponding to the first interface format.

Referring back to FIG. 2, next, in step S25, a first control interface is displayed by the remote control device 200 according to the received first control information, so that functions of the first electronic device 300 can be controlled through the first control interface.

Specifically, in response to the received first control information, the second processing unit 210 generates the first control interface according to the first interface format and the first infrared code set of the first control information, and commands the touch display module 260 to display the first control interface. The first interface format is configured to indicate positions, sizes, and shapes (or other properties related to the regions of the first interface) of regions of the first interface, wherein the regions are configured to control the respective functions of the first electronic device 300, and the first infrared code set includes infrared codes corresponding to the respective regions of the first interface format. In other words, the appearance of the first control interface displayed on the touch display module 260 is illustrated based on the first interface format, and each region of the first control interface has a corresponding infrared code. The infrared codes individually carries command code information (e.g., codes containing alternately arranged bit values "0" and "1"). The command codes individually correspond to control commands configured to execute the functions of the first electronic device 300. In other words, each infrared code corresponds to the control commands configured to execute the functions of the first electronic device 300.

In the present embodiment, according to a touch operation (e.g., a press operation) applied on a first region among the regions of the first control interface, the second processing unit 210 commands the infrared ray transceiving module 220 to use a corresponding first infrared code in the first infrared code set to transmit a first infrared signal to control (execute) a first function of the first electronic device 300 corresponding to the first region.

For example, it is assumed that the user performs a touch operation (e.g., pressing the button showing a text "timing" on the first control interface) on the first region of the first control interface displayed on the touch screen. The second processing unit 210 identifies the first infrared code (this infrared code corresponds to the command code for executing the timing function) corresponding to the touch operation of pressing the first region (the button showing the text "timing"), and commands the infrared ray transceiving module 220 to use the first infrared code to transmit the first infrared signal. The first infrared code includes the command code corresponding to the timing function of the first electronic device 300.

Accordingly, the first infrared signal is transmitted to the first electronic device 300 via the aiming path IP such that the infrared ray receiving module 320 receives and decodes the first infrared signal into the corresponding command code (also referred to as a first command code). As described above, the processing unit 310 issues a control command (also referred to as a first control command) according to the first command code to execute the first function (e.g., the timing function) of the first electronic device 300 corresponding to the first control command.

Likewise, the user can control the functions of the first electronic device by operating (i.e., performing different touch operations on) the first control interface displayed by the remote control device 200. An overall operation process of a remote control system provided in the embodiments of the invention will be described below with reference to FIG. 6A and FIG. 6B.

Figure 6A:
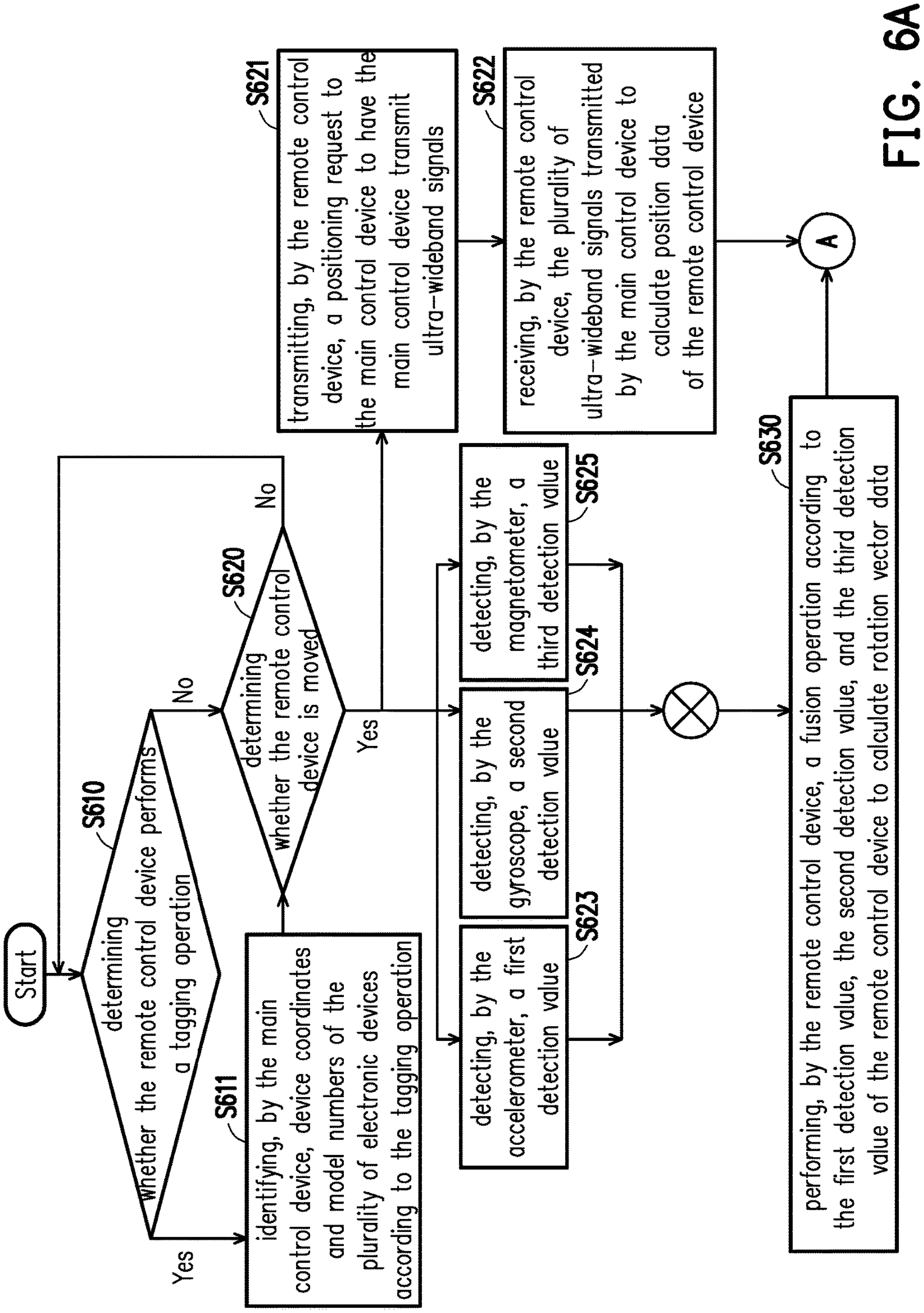
FIG. 6A and FIG. 6B are flowcharts illustrating an operation process of a remote control system according to an embodiment of the invention.
Figure 6B:
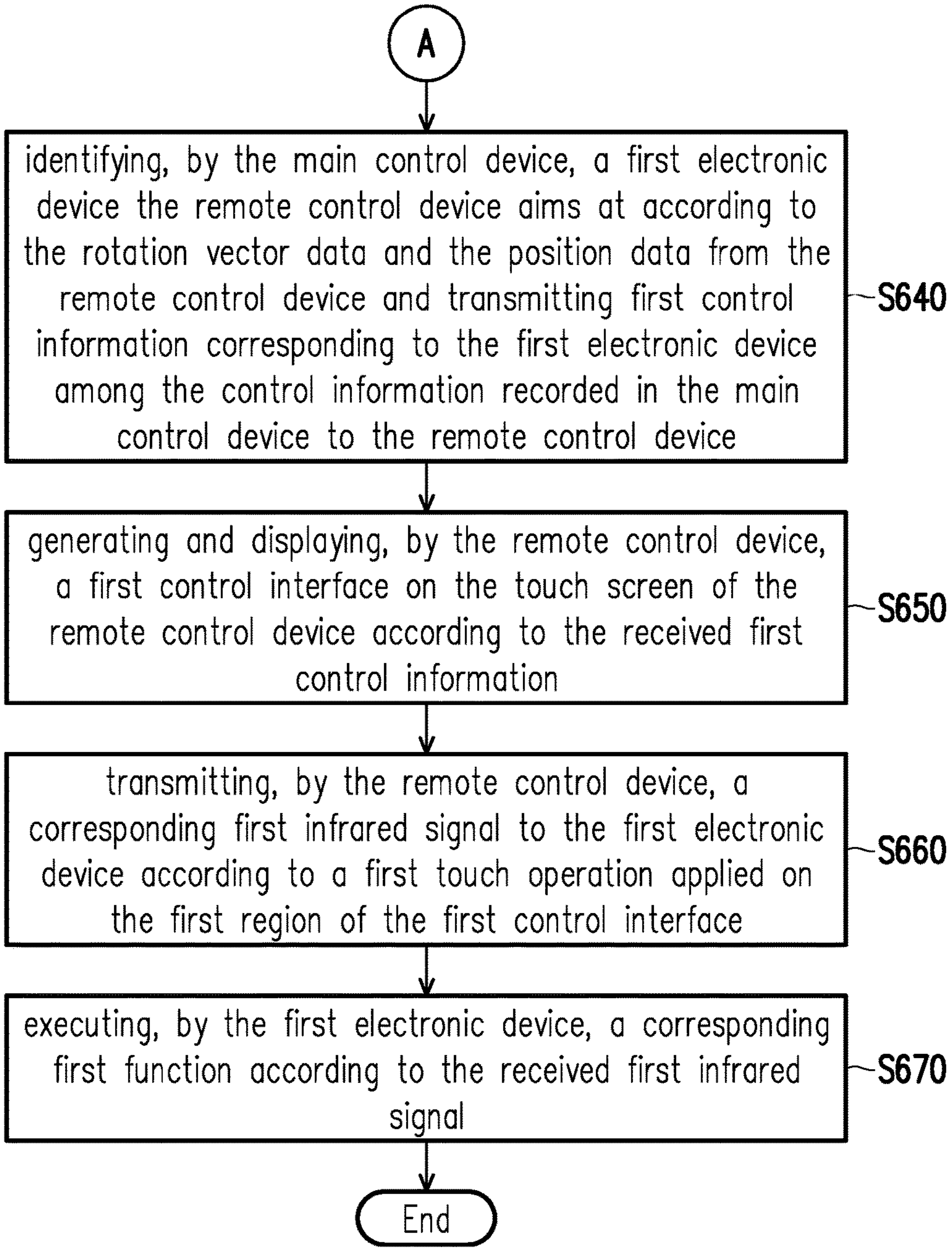

FIG. 6A and FIG. 6B are flowcharts illustrating an operation process of a remote control system according to an embodiment of the invention. Referring to FIG. 6A and FIG. 6B, in step S610, it is determined whether the remote control device 200 performs a tagging operation. In the present embodiment, the remote control device 200 may perform a tagging operation on electronic devices in the space in advance. For example, the user holds the remote control device 200 and gets to the position of the first electronic device 300 and then presses the button "tag" on the remote control device 200 to have the remote control device 200 perform the tagging operation. In response to the press operation on the "tag" button, the second processing unit 210 determines that the tagging operation is now to be performed. Proceeding to step S611, the main control device 100 identifies device coordinates and model numbers of the electronic devices according to the tagging operation. Specifically, if it is determined that the tagging operation is performed, the second processing unit 210 transmits a positioning request to the main control device 100 to obtain a current position data of the remote control device, and the position data is used as the device coordinates (also referred to as first device coordinates) of the first electronic device 300.

Moreover, in response to the press operation on the "tag" button, the second processing unit 210 displays a selection interface through the touch screen 260 to allow the user to select the model number (also referred to as a first model number) of the first electronic device 300. The second processing unit 210 transmits the first device coordinates and the first model number corresponding to the first electronic device 300 back to the main control device 100. The main control device 100 records the first device coordinates and the first model number corresponding to the first electronic device 300 in the first storage unit 130. Next, the main control device 100 downloads the first control information corresponding to the first model number from a cloud database connected via a network connection according to the first model number. The first control information is used to generate the first control interface configured to control the first electronic device 300. As described above, the first control information includes the first interface format configured to generate the first control interface and the first infrared code set corresponding to the first interface format. The downloaded first control information is stored in the control information database in the first storage device 130, and the tagging operation on the first electronic device 300 is completed. It is noted that the information (e.g., device coordinates, model numbers, names, etc.) corresponding to the electronic devices recorded in the main control device may be modified by the user through connecting to the main control device.

It is noted that, in another embodiment, the control information database may also be stored in the second storage unit. In other words, the downloaded control information is directly stored in the remote control device 200. Accordingly, the second processing unit 210 may also identify the targeted electronic device and directly read the corresponding control information from the control information database stored in the remote control device for displaying the control interface.

If the second processing unit 210 determines that the tagging operation is currently not performed (e.g., the "tag"

button is not pressed), proceeding to step S620, it is determined whether the remote control device 200 is moved. Specifically, as described above, the remote control device 200 detects whether the remote control device 200 is moved through the sensor of the remote control device 200. If the remote control device 200 determines that the remote control device 200 is not moved, return to step S610. If the remote control device 200 determines that the remote control device 200 is moved, proceed to steps S621, S623, S624, and S625. Specifically, if it is determined that the remote control device 200 is moved, the remote control device 200 transmits a positioning request to the main control device 100 to have the main control device 100 transmit ultra-wideband signals (step S621), and the remote control device 200 receives the ultra-wideband signals transmitted by the main control device 100 to calculate position data of the remote control device (step S622). Meanwhile, the remote control device 200 detects a first detection value through the accelerometer (step S623), detects a second detection value through the gyroscope (step S624), and detects a third detection value through the magnetometer (step S625). Next, the remote control device performs a fusion operation according to the first detection value, the second detection value, and the third detection value of the remote control device to calculate rotation vector data (step S630).

The remote control device 200 transmits the calculated position data and rotation vector data to the main control device (step A). Then, referring to FIG. 6B, in step S640, the main control device 100 identifies a first electronic device 300 the remote control device 200 aims at according to the rotation vector data and the position data from the remote control device 200 and transmits first control information corresponding to the first electronic device among the control information recorded in the main control device 100 to the remote control device 200.

In response to the received first control information, the remote control device 200 generates and displays a first control interface on the touch screen 260 of the remote control device 200 according to the received first control information (step S650).

Then, in step S660, according to a first touch operation applied on the first region of the first control interface, the remote control device 200 transmits a corresponding first infrared signal to the first electronic device. Then, the first electronic device 300 executes a corresponding first function according to the received first infrared signal (step S670). It is noted that, in another embodiment, in a learning manner similar to other smart remote controllers, the remote control device 200 may receive infrared signals corresponding to all the functions of the original remote controller of the first electronic device 300 to learn infrared codes corresponding to all the functions and record the learned infrared codes to the first control information.

In summary, in the remote control system, the remote control method, and the gateway provided in the embodiments of the invention, with the position data obtained by the remote control device by receiving the ultra-wideband signals transmitted by the main control device and the rotation vector data sensed by the remote control device, the main control device can identify the controlled electronic device the remote control device aims at and transmit the control information corresponding to the controlled electronic device to the remote control device to display the control interface corresponding to the controlled electronic device and allow the user to intuitively remotely control the electronic device directed to through the remote control device, which thereby enhances convenience of remote control operations performed by the user.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A remote control system comprising:

a remote control device, configured to remotely control a plurality of electronic devices, the remote control device comprising:

a rotation vector sensor, configured to calculate rotation vector data according to detection data of the remote control device;

an ultra-wideband module, configured to receive a plurality of ultra-wideband signals to calculate position data of the remote control device;

a second communication module, configured to transmit the rotation vector data and the position data;

a display module, configured to display a plurality of control interfaces corresponding to the electronic devices; and a second processing unit, coupled to the rotation vector sensor, the ultra-wideband module, the second communication module, and the display module, the first processing unit configured to selectively command the display module to display one of the control interfaces according to one of a plurality of control information, and control the electronic devices individually through the respective control interfaces; and a main control device comprising:

a first communication module, configured to establish a wireless connection with the second communication module, and receive the rotation vector data and the position data from the remote control device via the wireless connection;

an ultra-wideband positioning system, comprising a plurality of ultra-wideband beacons configured to transmit the respective ultra-wideband signals;

a storage unit configured to store the control information corresponding to the electronic devices; and a first processing unit, identifying a first electronic device the remote control device aims at among the electronic devices according to the rotation vector data and the position data, reading first control information corresponding to the first electronic device recorded in the storage unit, and transmitting the first control information to the remote control device via the wireless connection, wherein the second processing unit commands the display module to display a first control interface among the control interfaces according to the received first control information, and functions of the first electronic device are controlled through the first control interface.

2. The remote control system according to claim 1, wherein the rotation vector sensor comprises a micro-processor, an accelerometer, a gyroscope, and a magnetometer, wherein the micro-processor performs a fusion operation according to a first detection value detected by the accelerometer, a second detection value detected by the gyroscope, and a third detection value detected by the magnetometer to calculate the rotation vector data, wherein the rotation vector data comprises an azimuth value, a tilt value, and a roll value.

3. The remote control system according to claim 2, wherein the ultra-wideband positioning system further comprises an ultra-wideband management module, wherein when the second processing unit receives the calculated rotation vector data from the rotation vector sensor, the ultra-wideband management module receives a positioning request transmitted by the second processing unit via the wireless connection and commands the ultra-wideband beacons to transmit the respective ultra-wideband signals according to the received positioning request.

4. The remote control system according to claim 3, wherein the ultra-wideband beacons comprise a first ultra-wideband beacon, a second ultra-wideband beacon, and a third ultra-wideband beacon, wherein the first ultra-wideband beacon transmits a first ultra-wideband signal, the second ultra-wideband beacon transmits a second ultra-wideband signal, and the third ultra-wideband beacon transmits a third ultra-wideband signal, and the ultra-wideband module is further configured to calculate a first three-dimensional coordinate value, a second three-dimensional coordinate value, and a third three-dimensional coordinate value according to the first ultra-wideband signal, the second ultra-wideband signal, and the third ultra-wideband signal that are received, and input the first three-dimensional coordinate value, the second three-dimensional coordinate value, and the third three-dimensional coordinate value into a Kalman filter to calculate the position data.

5. The remote control system according to claim 4, wherein the storage unit is further configured to record a plurality of device coordinates corresponding to the respective electronic devices, and the first processing unit is further configured to obtain an aiming path according to the rotation vector data and the position data, identify a first device coordinate among one or more device coordinates in the aiming path that is closest to the remote control device according to the device coordinates and the first aiming path, and identify that the electronic device corresponding to the first device coordinate is the first electronic device, wherein the aiming path is configured to represent a path of an infrared signal transmitted by the remote control device according to a current position and orientation of the remote control device.

6. The remote control system according to claim 1, wherein the remote control device further comprises an infrared ray transceiving module, coupled to the second processing unit and configured to receive or transmit an infrared signal, wherein the infrared ray transceiving module transmits the infrared signal to the first electronic device according to an infrared code set of the first control information and a touch operation applied on the first control interface, and the first electronic device executes one of the functions of the first electronic device according to the received infrared signal.

7. A remote control method suitable for remotely controlling a plurality of electronic devices, the method comprising:

transmitting, by a main control device, a plurality of ultra-wideband signals;

receiving, by a remote control device, the ultra-wideband signals to calculate position data of the remote control device;

calculating, by the remote control device, rotation vector data according to detection data of the remote control device;

transmitting, by the remote control device, the rotation vector data and the position data to the main control device;

identifying, by the main control device, a controlled electronic device the remote control device aims at among the electronic devices and transmitting control information corresponding to the controlled electronic device to the remote control device according to the rotation vector data and the position data; and displaying, by the remote control device, a control interface corresponding to the controlled electronic device according to the received control information, so that functions of the controlled electronic device are controlled through the control interface.

8. The remote control method according to claim 7, wherein the remote control device comprises an accelerometer, a gyroscope, and a magnetometer, and the step of calculating, by the remote control device, the rotation vector data according to the detection data of the remote control device comprises:

performing a fusion operation according to a first detection value detected by the accelerometer, a second detection value detected by the gyroscope, and a third detection value detected by the magnetometer to calculate the rotation vector data, wherein the rotation vector data comprises an azimuth value, a tilt value, and a roll value.

9. The remote control method according to claim 8, wherein the step of transmitting, by the main control device, the ultra-wideband signals comprises:

transmitting, by the remote control device, a positioning request to the main control device when the rotation vector data is calculated; and transmitting, by the main control device, the ultra-wideband signals in response to the received positioning request.

10. The remote control method according to claim 9, wherein the ultra-wideband signals comprise a first ultra-wideband signal, a second ultra-wideband signal, and a third ultra-wideband signal, and the step of receiving, by the remote control device, the ultra-wideband signals to calculate the position data of the remote control device comprises:

calculating, by the remote control device, a first three-dimensional coordinate value, a second three-dimensional coordinate value, and a third three-dimensional coordinate value according to the first ultra-wideband signal, the second ultra-wideband signal, and the third ultra-wideband signal that are received, and inputting the first three-dimensional coordinate value, the second three-dimensional coordinate value, and the third three-dimensional coordinate value into a Kalman filter to calculate the position data.

11. The remote control method according to claim 10, further comprising storing, by the main control device, a plurality of device coordinates corresponding to the respective electronic devices, wherein the step of identifying, by the main control device, the controlled electronic device the remote control device aims at among the electronic devices according to the rotation vector data and the position data comprises:

obtaining, by the main control device, an aiming path according to the rotation vector data and the position data, wherein the aiming path is configured to represent a path of an infrared signal transmitted by the remote control device according to a current position and orientation of the remote control device; and identifying, by the main control device, a controlled device coordinate that is in the aiming path and is closest to the remote control device according to the aiming path and the device coordinates, and identifying that the electronic device corresponding to the controlled device coordinate is the controlled electronic device.

12. The remote control method according to claim 7, wherein the step of displaying, by the remote control device, the control interface according to the received control information, so that the functions of the controlled electronic device are controlled through the control interface comprises:

generating and displaying, by the remote control device, the control interface according to the control information;

transmitting, by the remote control device, an infrared signal to the controlled electronic device according to an infrared code set of the control information and a touch operation applied on the control interface; and executing, by the controlled electronic device, a function, among the functions of the controlled electronic device, corresponding to the infrared signal according to the received infrared signal.

13. A gateway comprising:

an ultra-wideband positioning system comprising a plurality of ultra-wideband beacons, wherein the ultra-wideband beacons are configured to individually transmit a plurality of ultra-wideband signals;

a storage unit configured to store a plurality of control information corresponding to a plurality of respective electronic devices;

a communication module configured to establish a wireless connection with a remote control device, and receive rotation vector data and position data of the remote control device from the remote control device via the wireless connection; and a processing unit, coupled to the ultra-wideband positioning system, the storage unit, and the communication module and configured to identify a first electronic device the remote control device aims at among the electronic devices according to the rotation vector data and the position data, read first control information corresponding to the first electronic device recorded in the storage unit, and transmit the first control information to the remote control device via the wireless connection.

14. The gateway according to claim 13, wherein the rotation vector data comprises an azimuth value, a tilt value, and a roll value.

15. The gateway according to claim 14, wherein the ultra-wideband beacons comprise a first ultra-wideband beacon, a second ultra-wideband beacon, and a third ultra-wideband beacon, wherein the ultra-wideband positioning system further comprises an ultra-wideband management module configured to receive a positioning request transmitted by the remote control device via the wireless connection, and command the first ultra-wideband beacon to transmit a first ultra-wideband signal, the second ultra-wideband beacon to transmit a second ultra-wide-band signal, and the third ultra-wide-band beacon to transmit a third ultra-wide-band signal in response to the received positioning request.

16. The gateway according to claim 15, wherein the position data is obtained by inputting a first three-dimensional coordinate value, a second three-dimensional coordinate value, and a third three-dimensional coordinate value into a Kalman filter, wherein the first three-dimensional coordinate value, the second three-dimensional coordinate value, and the third three-dimensional coordinate value are individually calculated and obtained by the remote control device according to the first ultra-wideband signal, the second ultra-wideband signal, and the third ultra-wideband signal that are received.

17. The gateway according to claim 16, wherein the storage unit records a plurality of device coordinates corresponding to the respective electronic devices, and the processing unit obtains an aiming path according to the rotation vector data and the position data, wherein the aiming path is configured to represent a path of an infrared signal transmitted by the remote control device according to a current position and orientation of the remote control device, and the processing unit identifies a first device coordinate among one or more device coordinates located in the aiming path that is closest to the remote control device according to the device coordinates and the aiming path, and identifies that the electronic device corresponding to the first device coordinate is the first electronic device.

18. The gateway according to claim 13, wherein the first control information comprises an infrared code set corresponding to the functions of the first electronic device, and the infrared code set comprises a plurality of infrared codes corresponding to the respective functions of the first electronic device.

* * * * *